United States Patent
Wang

(10) Patent No.: US 7,076,229 B2
(45) Date of Patent: Jul. 11, 2006

(54) CIRCUITS WITH IMPROVED POWER SUPPLY REJECTION

(75) Inventor: Zhenhua Wang, Zürich (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 185 days.

(21) Appl. No.: 10/500,764

(22) PCT Filed: Jan. 9, 2003

(86) PCT No.: PCT/IB03/00027

§ 371 (c)(1),
(2), (4) Date: Jul. 6, 2004

(87) PCT Pub. No.: WO03/059024

PCT Pub. Date: Jul. 17, 2003

(65) Prior Publication Data

US 2005/0064837 A1    Mar. 24, 2005

(30) Foreign Application Priority Data

Jan. 12, 2002   (EP) .................................. 02000759

(51) Int. Cl.
*H04B 1/10*    (2006.01)

(52) U.S. Cl. ...................... 455/296; 455/298; 455/313; 455/317; 455/323; 455/333; 327/113

(58) Field of Classification Search ................ 455/296, 455/298, 313, 317, 323, 333, 307, 63.1, 67.13; 327/113

See application file for complete search history.

(56) References Cited

U.S. PATENT DOCUMENTS 5,029,238 A * 7/1991 Gehr .......................... 455/222
6,360,090 B1 * 3/2002 Holcombe et al. .......... 455/307

* cited by examiner

*Primary Examiner*—Nay Maung
*Assistant Examiner*—Tuan H. Nguyen
(74) *Attorney, Agent, or Firm*—Aaron Waxler

(57) ABSTRACT

Circuit comprising a noise suppressing circuitry (40) having an input (42) for a first voltage (VDD) and an output (43) for providing a supply voltage (VDDfiltered). The circuit further comprises a MOSFET-based switch (41) with a MOSFET (MP) being situated in a well, whereby a supply voltage (VDDfiltered) is applied to the well (67). The first voltage (VDD) is a global voltage used elsewhere in the same circuit, and the supply voltage (VDDfiltered) is less-noisy than the first voltage (VDD).

10 Claims, 5 Drawing Sheets

CIRCUITS WITH IMPROVED POWER SUPPLY REJECTION

The present invention relates to circuits having an improved power supply rejection.

In particular, the present invention relates to analog circuits or mixed-signal circuits.

With ever increasing integration level and the advanced process technology, analog chips and mixed-signal chips now contain more and more circuit blocks. As a consequence, the power supply of a chip is becoming increasingly hostile to sensitive analog and mixed-signal circuits.

The big challenge to designers is to maintain or improve the circuit performance on one hand and to reduce the supply voltage on the other hand. This entails circuits with higher power supply rejection (PSR).

Analog switches are important and indispensable elements in circuitries such as sampling circuits, switched-capacitor (SC) circuits, switched-current (SI) circuits, automatic gain control (AGC), circuits for testing purpose, and so forth.

Power-supply errors occur when noise from the power supply mixes with the signals being processed by the respective circuit. The power supply rejection specification is a measure of how well a circuit is able to block power supply noise. In other words, PSR is the ability of a circuit to be unaffected by power supply noise and variations. Depending on the kind of circuit implementation, values of 100 dB or more are common. PSR varies with frequency. If the PSR is divided by the circuit gain (hence input-referred), the term becomes PSRR, or power-supply rejection ratio.

An automatic gain control (AGC) circuit is quite a complex circuit primarily used in communication systems to achieve the highest sensitivity and to cope with the huge range of signal strengths. FIG. 1 shows a schematic block diagram of a receiver 10 designed for employment in a communication system. Here, signals undergo two AGCs 11 and 12 before being processed by base-band (BB) circuitries 13. Basically, an AGC provides several gains in steps within a certain range. FIG. 2A illustrates the principle of an AGC 11. With the switches S1 opened, the gain of the AGC circuit 11 is given by the ratio of the resistors R3/R1. When the switches S1 are closed, the resistors R1 and R2 will be in parallel, yielding a higher gain of (1+R1/R2)(R3/R1). The change in gain is 1+R1/R2. More gains/steps are available when more switches and resistors are added.

The switches (S1) 20 in FIG. 2A are normally built with complementary metal-oxide semiconductor field-effect transistors (CMOSFETs) in a manner of the so-called transmission gate, detailed in FIG. 2B. Here, a pMOS transistor MP and an nMOS transistor MN are connected in parallel, with two junctions A and B as terminals of the switch 20. A control signal (Control) is applied to the gate 21 of the transistor MN and the inverted signal ($\overline{\text{Control}}$) to the gate 22 of the transistor MP. The inverted signal ($\overline{\text{Control}}$) is provided by an inverter 23.

When using a standard CMOS process, a pMOS transistor is situated in an n-well or on a bulk substrate, and in common practice, this n-well or bulk is required to have the highest potential of the whole circuit, i.e., the power supply VDD, as shown in FIG. 2B where the bulk 25 of the transistor MP, as well as the power supply line 24 of the inverter 23, are connected to VDD, which is normally global.

Problems arise in conventional circuits because of the fact that the actual power supply that is applied to each circuit is no more a DC voltage determined by a battery, rather, it becomes very noisy and severely polluted. If at the output 14 of the AGC 11, for example, the noise due to inadequate PSR is bigger than the signal received at the antenna 15, the circuit 10 would fail to work properly. This is highly likely because the signal picked up by the antenna 15 is very weak and the gain of the LNA 16 and the mixer 17 is limited to 20 to 30 dB. Simulations for the circuit 10 have been made. The simulated result is depicted in FIG. 6, where curve 51 represents the case where the supply voltage VDD is applied to the circuit's bulk, i.e., bulk=VDD.

Like other circuits, the AGC 11 here employs one (or more) operational amplifiers 18 (op-amps), passive elements such as resistors (or capacitors), and some analog switches. Depending on their implementation, the presence of each part of a circuit has been found to degrade the PSR of the entire circuit. While the op-amp with single output is the dominant source due to its limited PSR, it has been found out that its PSR can be very high if its output 19 is made differential, as well, like the case in FIG. 2A. Some resistor types, notably n-well, may be more prone to supply variations than other types, say, active types. But if poly-resistors are used, they can be considered voltage-independent.

Indeed, the PSR of many conventional circuits is very poor and inadequate.

It is an object of the present invention to provide circuits with an improved performance, and devices based on such circuits It is another object of the present invention to provide circuits and devices based thereon with an improved PSR.

These and other objects are accomplished by a circuit according to claim 1 and an automatic gain control (AGC), according to claim 10, comprising such a circuit.

A circuit comprises, in accordance with the present invention, a noise suppressing circuitry that has an input for a first voltage and an output for providing a supply voltage (VDDfiltered). The circuit further comprises a MOSFET-based switch with a MOSFET (MP) being situated in a well. A supply voltage is applied to well, whereby the first voltage is a global voltage used elsewhere in the same circuit and the supply voltage is less noisy than the first voltage (VDD). The noise suppressing circuitry has a noise suppression characteristic where frequencies within a bandwidth range around the upper edge of the circuit's frequency band are damped.

Further advantageous implementations are claimed in claims 2–9.

For a more complete description of the present invention and for further objects and advantages thereof, reference is made to the following description, taken in conjunction with the accompanying drawings, in which.

Figure 1:
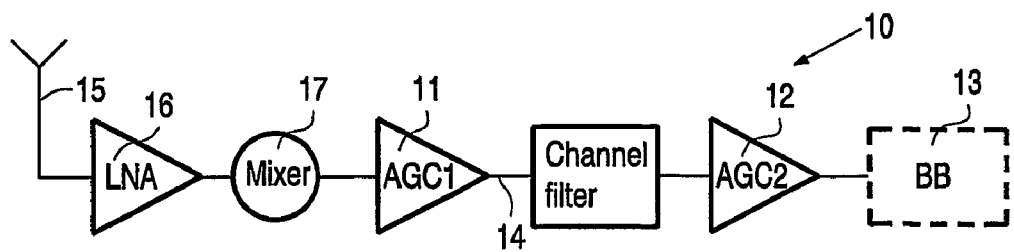
FIG. 1 is a schematic representation of a conventional receiver circuit designed for employment in a communication system.
Figure 2A:
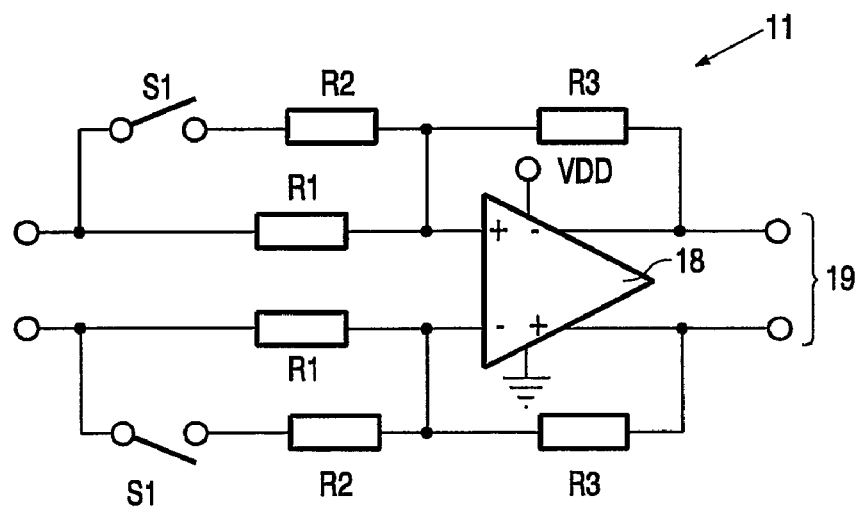
FIG. 2A is a schematic representation of an AGC with switchable resistors.
Figure 2B:
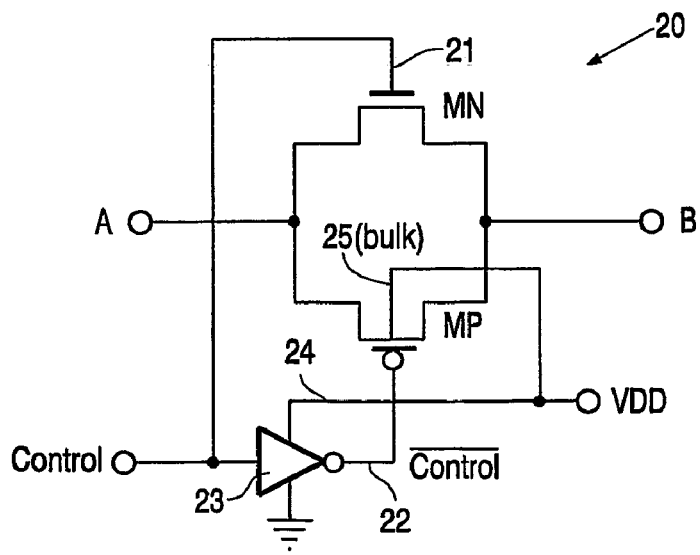
FIG. 2B is a general realization of a transmission-gate switch using CMOS-FETs.
Figure 3:
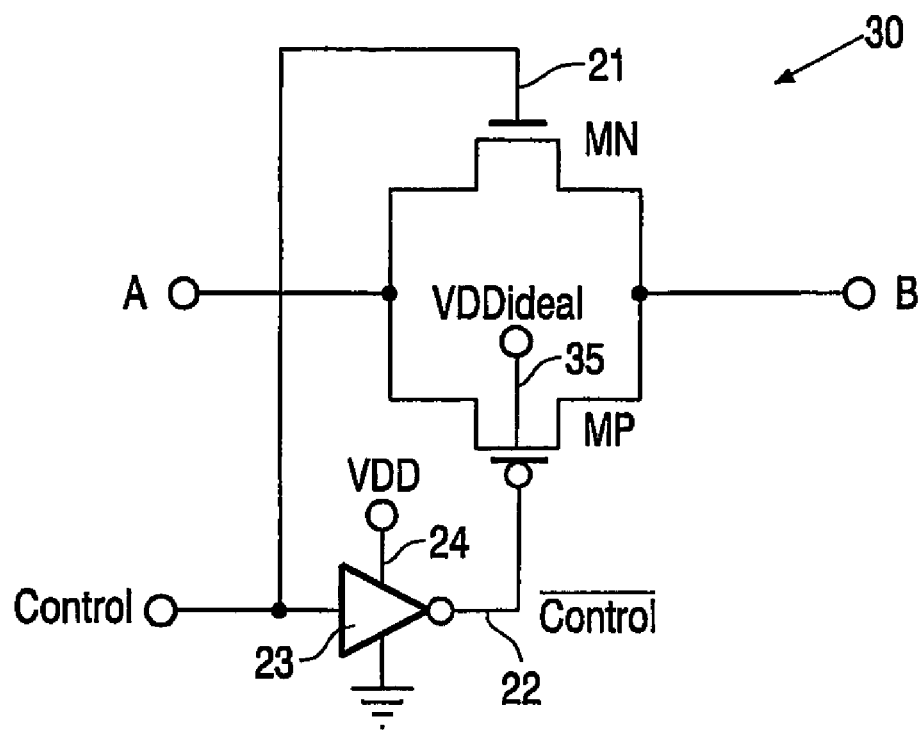
FIG. 3 is a schematic representation of a transmission-gate switch, according to the present invention.

According to the present invention, an improved performance can be achieved, when the power supply rejection (PSR) of each circuit is high enough. This is possible by connecting the bulk of the transistor MP in a switch 30 to an ideal supply voltage that is a clean and noise-free DC voltage (VDDideal) of the same value as VDD, as schematically illustrated in FIG. 3. The corresponding result (where bulk=VDDideal) is depicted in FIG. 5 by the reference number 52.

With the present invention, the PSR of the AGC 11, for example, can be improved by up to 25 dB.

One possible way to provide such a DC voltage is to add a dedicated contact pad on the chip to apply an external DC voltage that is clean and noise-free. This approach, however, is not convenient in chips where there is no room on the chip for such an additional contact pad, or where the routing of the various signal and supply lines does not allow another supply line to be routed from such an additional contact pad to the circuit where the clean and noise-free DC voltage is needed.

Figure 4:
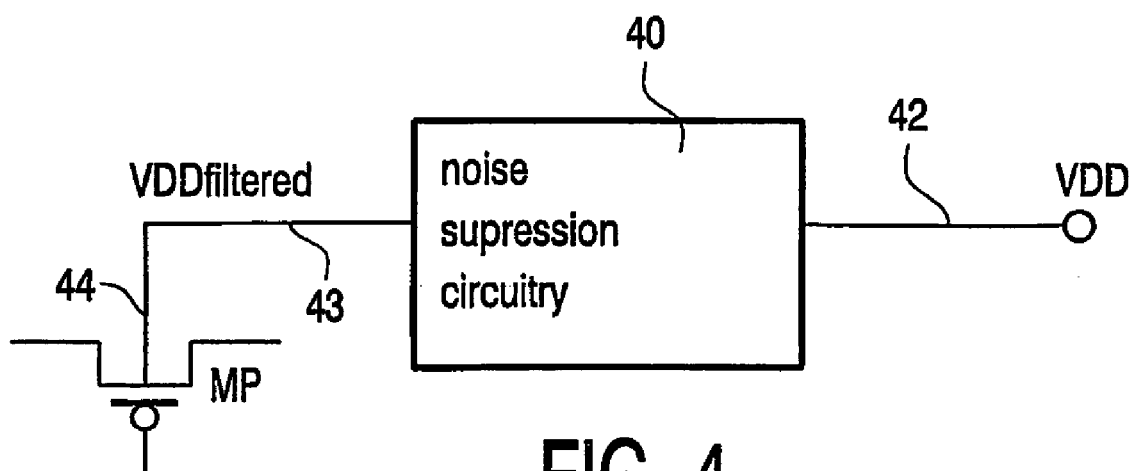
FIG. 4 is a schematic representation of a transistor whose bulk is connected to an ideal supply voltage.

According to a first embodiment of the present invention, an improved DC voltage (VDDfiltered) is generated that is cleaner than the supply voltage VDD. The improved DC voltage is a DC voltage derived directly from the supply voltage VDD. A noise suppression circuitry 40 is employed to provide the improved DC voltage at an output 43, as schematically illustrated in FIG. 4. In the present example, the improved DC voltage is applied to the bulk 44 of a transistor MP. The transistor MP can be part of a MOSFET-based switch, for example.

Figure 5A:
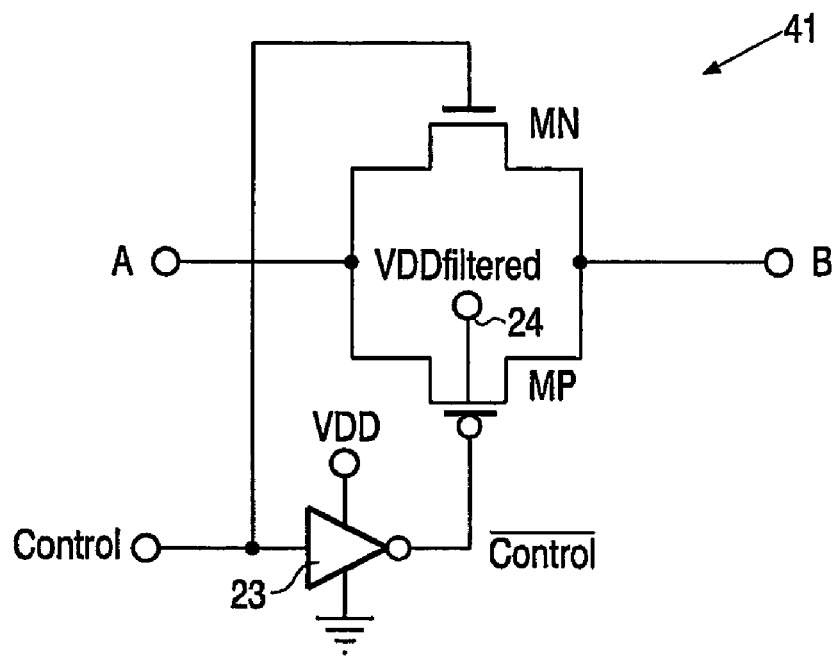
FIG. 5A is a schematic representation of another transmission-gate switch, according to the present invention.
Figure 5B:
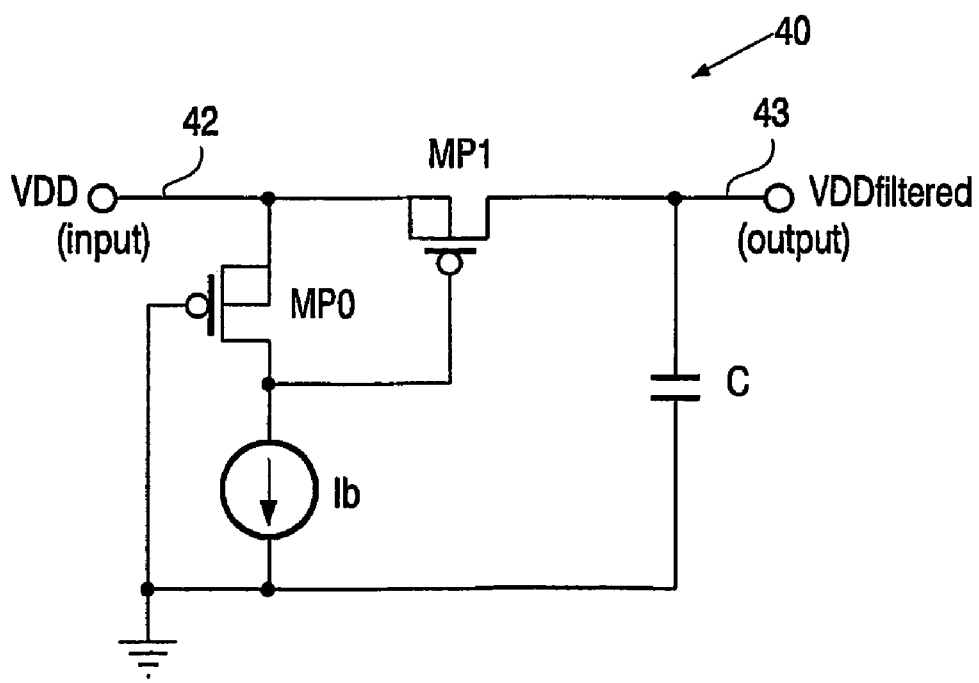
FIG. 5B is a schematic representation of a low-pass filter, according to the present invention.

A second embodiment is illustrated in FIGS. 5A and 5B. The circuit comprises a noise suppressing circuitry 40 and a transmission-gate switch 41. The noise suppressing circuitry 40 has an input 42 for a first voltage (in the present example VDD) and an output 43 for providing an improved DC voltage (VDDfiltered). The transmission-gate switch 41 is a MOSFET-based switch with an N-MOS FET (MN) and a P-MOS FET (MP) being situated in a bulk or n-well. The improved DC voltage (VDDfiltered) is applied to the bulk 44 in which the P-MOS FET (MP) is situated. The first voltage (VDD) is an internal voltage, i.e., a voltage that is used elsewhere in the same chip. The improved DC voltage (VDDfiltered) is less-noisy than the first voltage, and the noise suppressing circuitry 40 has a noise suppression characteristic where frequencies within a wide bandwidth of interest (herein referred to as bandwidth range) around the upper edge of the circuit's frequency band are damped. In the present example, a low-pass filter (LPF) serves as noise suppressing circuitry 40. The LPF is employed to provide the improved DC voltage (VDDfiltered). A 1st-order LPF is already adequate to achieve remarkable results.

Figure 6:
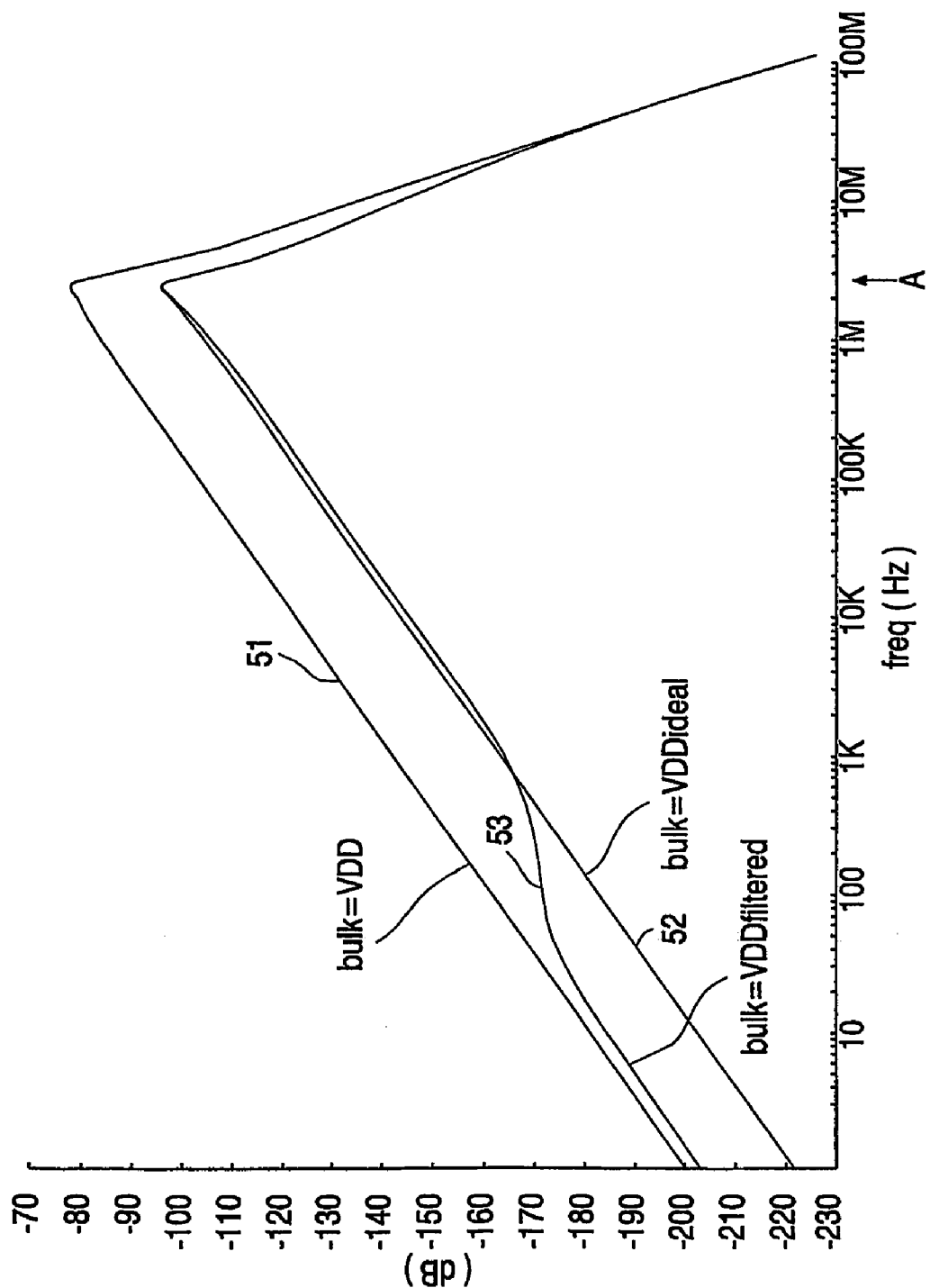
FIG. 6 is a schematic diagram demonstrating the effectiveness of the inventive approach.

The LPF may take the supply voltage VDD as an input signal and generates a cleaner and less-noisy output voltage, herein referred to as VDDfiltered. By adjusting the corner frequency of the LPF, almost the same performance can be obtained as with the voltage VDDideal (represented by curve 52 in FIG. 6).

As mentioned above, a simple 1st-order LPF will be sufficient. There are various ways to realize a 1st-order LPF. Note that when using a LPF, the PSR improvement only takes place for frequencies outside the bandwidth of the LPF. For many applications a larger RC time constant, i.e., lower corner frequency, is called for. For this reason, the realization of a very large time constant using a passive resistor and capacitor would lead to a relative big area overhead.

According to the second embodiment of the present invention, the LPF 40 has a very large time constant. The LPF 40 comprises simulated resistors. In FIG. 5B, at the place of a passive resistor two pMOS transistors MP0 and MP1, as well as a current source Ib are put. The transistor MP1 is biased in the sub-threshold region by the transistor MP0 and the current source Ib. Detailed simulations revealed that with a supply voltage VDD=2.6V, a current Ib=1 µA, an MP0 transistor of size 1/21, a 1.5 GΩ resistor is obtained with an MP1 transistor of a size 0.5/3. In that simulation, the value of the capacitor C is 0.75 pF. The calculation of the time constant should include the parasitic capacitances of the n-well. With these circuit elements, the reached PSR (bulk=VDDfiltered) is depicted by reference number 53 in FIG. 6. From the curve 53 in FIG. 6 it can be derived that in the present example the inventive PSR method is effective from the upper edge frequency of about 2.5 MHz down to as low as about 1 kHz, and up to about 7–8 MHz. The corner frequency of the LPF 40 can be shifted to lower frequencies by increasing the time constant, thus approaching the performance obtained with VDDideal (see curve 52 in FIG. 6).

The conditioning of the power supply voltage is achieved using a noise suppression circuitry. This noise suppression circuitry produces a very precise and stable voltage over a range of temperature and power supply conditions, whereby it takes an internal voltage as an input voltage from which it produces an output voltage that is cleaner than the internal voltage.

When referring to an internal voltage, a voltage is meant that is already available on the chip. In connection with the present invention, VDD is usually used as internal voltage. VDD stems from one or more VDD pins of the circuit and its lines go to almost everywhere within the chip. Hence, it is highly likely to find such a VDD line in the vicinity of the switches where an improved DC voltage (VDDfiltered) needs to be generated and applied to the bulk.

Figure 7A:
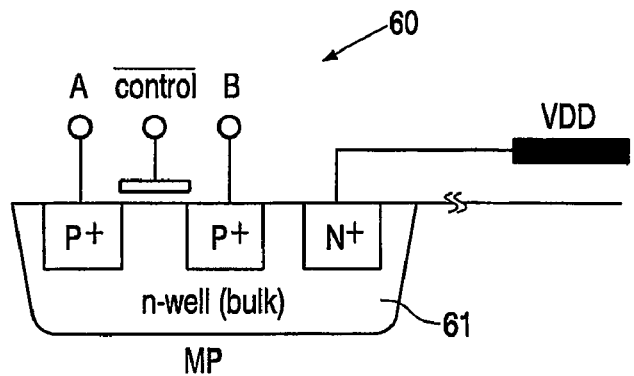
FIG. 7A is a schematic representation of a transistor with conventional power supply.
Figure 7B:
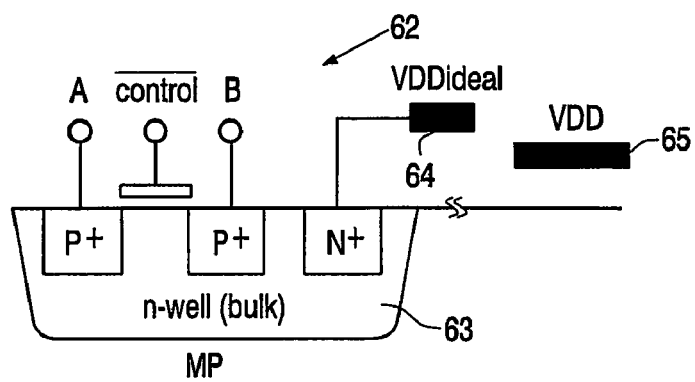
FIG. 7B is a schematic representation of a transistor; according to the present invention.

As mentioned in the above, the bulk 61 of pMOS transistor 60 (MP) in a switch is in conventional circuits connected to the global supply VDD, as illustrated in FIG. 7A. This differs itself strongly from the approach proposed herein and illustrated in FIGS. 3, 5A, 7B, and 7C. In FIG. 7B, the n-well 63 of a transistor 62 (MP) is connected to another node 64 rather than VDD 65, and this node 64 is by no means short-circuited with VDD 65.

Figure 7C:
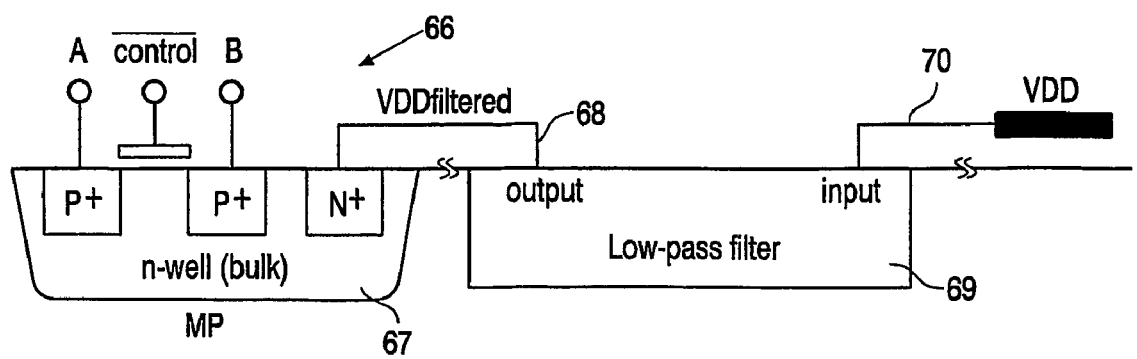
FIG. 7C is a schematic representation of another transistor; according to the present invention.

According to FIG. 7C, the bulk 67 of a pMOS transistor 66 (MP) in a switch is connected to the output 68 of a low-pass filter 69. The input 70 of the LPF 69 is connected to VDD.

Any other type of low-pass filter can be used in connection with the present invention. Instead of a low-pass filter a band-pass filter can be employed, or a voltage regulator may serve as noise suppressing circuitry. When using a voltage regulator, the improved DC voltage (VDDfiltered) is smaller than VDD.

The present invention is very well suited for use in analog circuits or mixed-signal circuits. The invention can be employed in systems on a chip, in audio amplifiers (e.g., for cellular phones), in chips for PDA applications and in chips for any other portable electronic device. The invention is well suited for use in sampling circuits, switched-capacitor (SC) circuits, switched-current (SI) circuits, automatic gain control (AGC), and circuits for testing purposes, just to give some examples.

At lower frequencies (e.g., below A=2 MHz in FIG. 6), the power supply rejection is not a serious problem. The noise suppression circuitry proposed herein thus preferably is designed such that it shows an effect at about A=2 MHz.

It is an advantage of the various embodiments presented herein that they feature an improved Power Supply Rejection Ratio (PSRR). According to the present invention, the PSRR performance can be improved for many applications by up to 25 dB over known solutions, by reducing the effect of noise on the power supply. In other words, up to a 10-fold improvement can be achieved.

It is another advantage of the present invention that it allows system designers to save space and to increase the cost-effectiveness.

In the drawings and specification there has been set forth preferred embodiments of the invention and, although specific terms are used, the description thus given uses terminology in a generic and descriptive sense only and not for purposes of limitation.

The invention claimed is:

1. Circuit comprising
a noise suppressing circuitry (40; 69) having an input (42; 70) for a first voltage (VDD) and an output (43; 68) for providing a supply voltage (VDDfiltered),
a MOSFET-based switch (41) with a MOSFET (MP) being situated in a well (67), where a supply voltage (VDDfiltered) can be applied to well (67),
whereby
the first voltage (VDD) is a global voltage used elsewhere in the same circuit,
the supply voltage (VDDfiltered) is less-noisy than the first voltage (VDD), and
the noise suppressing circuitry (40; 69) has a noise suppression characteristic where frequencies within a bandwidth range around the upper edge of the circuit's frequency band are damped.

2. The circuit of claim 1, whereby the MOSFET is a P-MOSFET (MP) and the well is an n-well (67).

3. The circuit of claim 1, whereby the noise suppressing circuitry is a filter (40; 69), preferably a low-pass filter or a band-pass filter.

4. The circuit of claim 1, whereby the noise suppressing circuitry is a voltage regulator and the supply voltage (VDDfiltered) is smaller than the first voltage (VDD).

5. The circuit of claim 3, whereby the filter (40; 69) is a 1st-order filter.

6. The circuit of claim 5, whereby the filter (40) comprises pMOS transistors (MP0, MP1), a current source (Ib) and at least one capacitor (C).

7. The circuit of claim 3, whereby the filter (40) comprises simulated resistors, preferably resistors being simulated by two PMOS transistors (MP0, MP1).

8. The circuit of claim 1, whereby the n-well (67) has the highest potential of the whole circuit.

9. The circuit of claim 1 being an analog circuit or a mixed-signal circuit.

10. Automatic gain control (AGC) comprising a circuit according to claim 1.

* * * * *